Oct. 9, 1962
A. L. SCHLENSKER
3,057,491
POWER LIFT AND TAIL GATE
Filed April 22, 1960
2 Sheets-Sheet 1
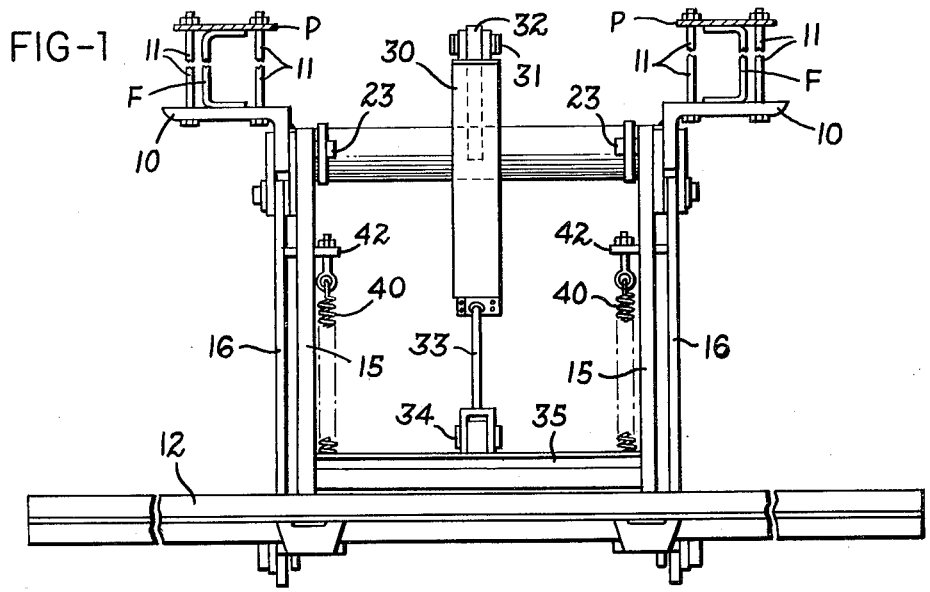
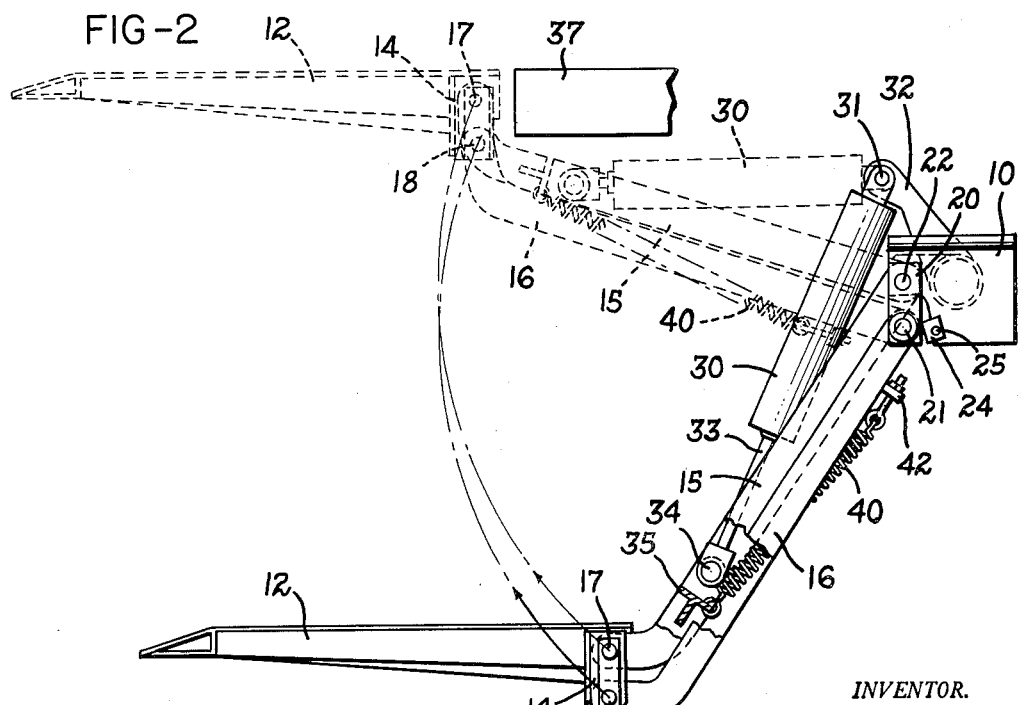
INVENTOR.
ALBERT L. SCHLENSKER
BY
Marechal, Biebel, French & Bugg
ATTORNEYS Oct. 9, 1962     A. L. SCHLENSKER     3,057,491

POWER LIFT AND TAIL GATE

Filed April 22, 1960     2 Sheets-Sheet 2

*INVENTOR.*
ALBERT L. SCHLENSKER
BY
*Marechal, Biebel, French & Bugg*
ATTORNEYS

United States Patent Office 3,057,491
Patented Oct. 9, 1962

3,057,491
POWER LIFT AND TAIL GATE
Albert L. Schlensker, Noblesville, Ind., assignor, by mesne assignments, to Golay & Co., Inc., Cambridge City, Ind., a corporation of Indiana
Filed Apr. 22, 1960, Ser. No. 23,987
5 Claims. (Cl. 214—77)

This invention relates to power operated lifts, particularly of the type adapted for mounting at the rear of a truck or the like to assist in the loading and unloading thereof, and in which the lift surface is also mounted for pivoting movement in its raised position to provide a gate member which extends across the rear of the truck body performing the same function as a tail gate in closing the rear of the truck.

In such constructions the lift gate member or platform is moved between raised and lowered locations by a lift motor, usually a hydraulic cylinder. In its raised location the platform is generally in line with the bed of the truck and will also form a tail gate by pivoting between a horizontally extending and a vertically extending position to enclose the rear of the truck. By reason of its function as a lift, the gate member or platform must be of rather heavy construction, since it may be required to support substantial loads and as a consequence it is heavier than an ordinary tail gate. Thus, considerable manual exertion is required to pivot the gate member from its raised horizontal position to its vertical closing position, wherein it functions as the truck tail gate.

The principal object of this invention is to provide a novel life mechanism and tail gate construction wherein energy is stored in a spring or like device during movement of the gate member or platform from lowered to raised locations, operating as a lift, and this energy is then released to assist movement of the gate member from horizontal to vertical positions, thereby reducing the amount of physical exertion required to pivot the gate member to its closed position against the force of its own weight.

Another object of this invention is to provide a novel lift mechanism and tail gate combination particularly adapted for mounting on the rear of truck bodies, wherein the gate member performs as a lift, with its surface positioned horizontal and swung between relatively lowered and raised locations by a parallel linkage system such that the surface of the gate member remains horizontal acting as a platform during lifting, and wherein energy is stored in a spring acting between links of the mechanism and released during pivoting of the gate member to a vertical closed position at the raised location, closing the end of the truck body.

Another object of the invention is to provide such a mechanism wherein an adjustment is provided for leveling the gate member, providing a horizontal surface during the lifting function.

Other objects and advantages of the invention will be apparent from the following description, the accompanying drawings and the appended claims.

What is claimed is:

FIG. 1 is an elevational view of the lift mechanism and tail gate structure provided by this invention;

FIG. 2 is a side elevational view of the mechanism, showing the gate member in its lowered location in full lines and in its raised location in dotted lines;

Figure 3:
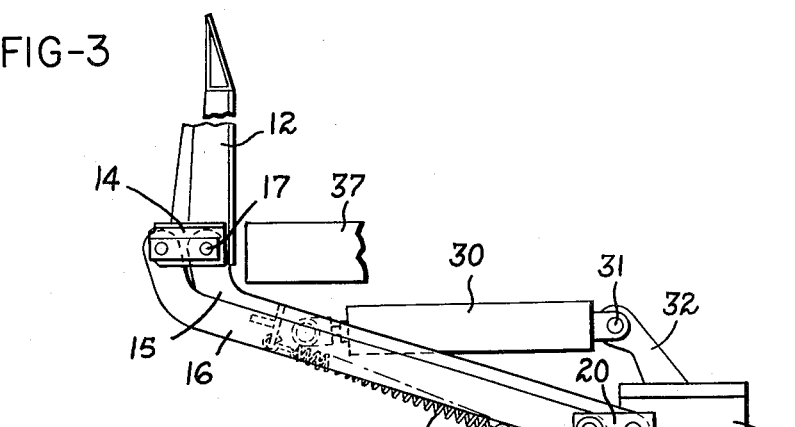
FIG. 3 is a view similar to FIG. 2, showing the vertical position of the gate member when functioning as the tail gate of the truck.

Referring to the drawings, and particularly to FIGS. 1–3, the rear portion of the chassis framework of a truck or light vehicle is represented by the channel members F. The mounting angles 10 are secured to these frame channels by bolts 11 which may be engaged, for example, with a clamp plate P. Thus, the present unit can be mounted to the truck frame without alteration such as welding or drilling. This mounting provides a support for the linkage system which carries the combination platform and gate member 12. Actually, there are two linkage systems, connected to opposite sides of the frame 10, as shown in FIG. 1. However, since the linkage operates simultaneously and in the same fashion, the parts of the linkage system and their relative movements are described with respect to one side only, as shown in FIGS. 2 and 3, and the same reference numerals are applied to like parts in the matching linkage as seen in FIG. 1.

Thus, in FIGS. 2 and 3 the linkage system is shown as including a short rigid link or bar 14 which is fastened to the underside of the gate member or platform 12, preferably secured at right angles to the surface thereof, such that when the link 14 is maintained vertical the surface of the gate member is horizontal. Upper and lower links or arms 15 and 16 are pivotally secured at 17 and 18, respectively, to the link 14, with the pivot points being vertically spaced as shown. The other ends of the long links are connected to a short link 20 through pivot connections 21 and 22, and the connections 22 being provided by studs or stub axles which are suitablly maintained in position by pins 23. A stop plate 24 is adjustably fastened to the framework 10, as by a bolt 25, and engages the link 20 to define the normally vertically extending position thereof, whereby the horizontal positioning of platform 12 can be adjusted.

Therefore, the links 15 and 16 each can rotate or swing about the respective pivotal connections 21 and 22, with the link 20 maintained stationary, as by the weight of the mechanism itself, during such swinging movement. For example, in moving between the full line and dotted line positions in FIG. 2, the link 20 will remain stationary with respect to the stub axles 23, and due to the parallel linkage system the platform or gate member 12 will likewise remain horizontal as it moves between its lowered and raised positions.

Such movement may be accomplished by a motor, for example in the form of a hydraulic cylinder 30 supplied with hydraulic pressure fluid from a suitable source (not shown) and having its cylinder part pivotally secured to a cross pin 31 which is mounted on a stationary arm 32 extending from the frame. The piston rod 33 of the hydraulic cylinder is connected through a cross pin 34 to a cross bar 35 fastened between the links 15. Thus, the hydraulic cylinder 30 will control the swinging movement of the linkage system to move the platform 12 between lowered and raised positions, but the platform will be maintained horizontal to support a load thereon.

Once the load has been removed from the platform or gate member, it may then function, when in its raised location, as a tail gate extending vertically with respect to the truck bed, the rearward end of which is shown schematically at 37. Thus, while the hydraulic cylinder 30 maintains the linkage system and gate member in the raised location, the gate member may be swung manually from horizontal to the vertical position shown in FIG. 3, and during such movement the link 14 will pivot about the point 17, moving the link 16 and its pivot connection 21 to carry the short link 20 about the stub axle 22. It will be appreciated, however, that since the gate member is of relatively heavy construction, to support considerable loads thereon when operating as a lift, the manual force required to accomplish such pivoting movement will be substantial.

Accordingly, the present invention provides a power system for such pivoting movement of the platform or gate member 12 in the form of an energy storing device which may conveniently take the form of a tension spring 40 secured between a fixed point on link 15, conveniently chosen as a portion of cross bar 35, and a fixed point on link 16, provided by the lug 42 extending therefrom. With the platform in its lowered location, as shown in full lines in FIGS. 1 and 2, the spring 40 is essentially relaxed, or at most under only slight tension.

Figure 4:
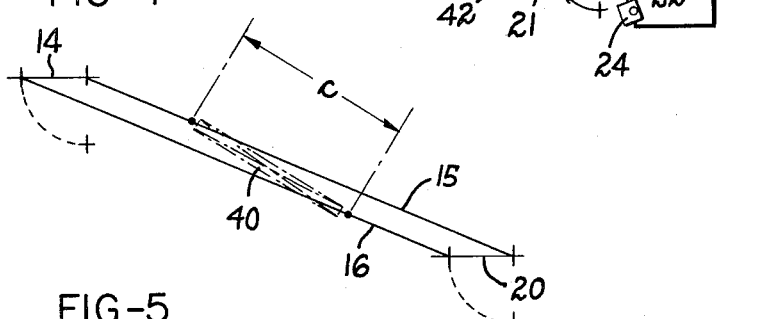
FIGS. 4–6 are linkage diagrams illustrating the action of the spring energy storage device.
Figure 5:
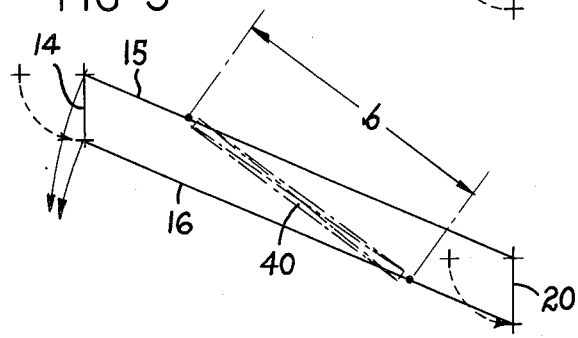
Figure 6:
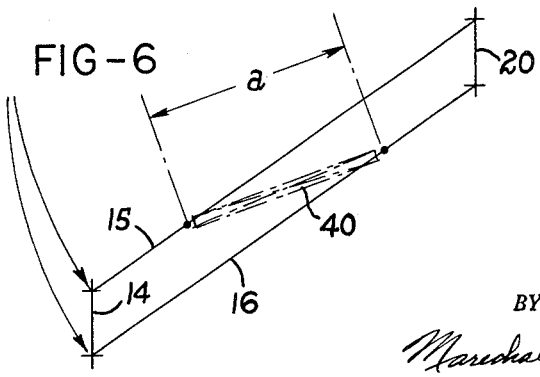

During the lifting operation, moving the gate member to its relatively raised location, the spring is stretched and energy is stored therein, since these fixed points on the links 15 and 16 move apart. This relationship is most clearly illustrated in FIGS. 5 and 6, where the distance $a$ in FIG. 6 is seen as considerably shorter than the distance $b$ in FIG. 5. Then, if the gate member or platform 12 is grasped and swung toward its vertical position, as in FIG. 3, these fixed points on the links will approach each other, and as spring 40 is allowed to contract the energy stored therein will be expended toward drawing the links to the position shown in FIG. 3, and the distance $c$ in FIG. 4 will be considerably less than the distance $b$ in FIG. 5.

Therefore, this energy returned from the spring into the linkage system provides the power assistance to moving the gate member to its vertical position, against the force of its own weight. Of course, in returning the gate member to its horizontal position the spring will be stretched, but in this operation the weight of the gate member tends to move it toward horizontal, once the pivotal movement is initiated, and in effect the spring will then act as a counter-balance, again assisting the manual movement of the gate member or platform.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A tail gate and lift mechanism comprising a relatively flat platform, a pair of links pivotally connected at one end to said platform at vertically spaced positions, means providing spaced apart pivot mountings for the other ends of said links, one of said pivot mountings being rotatable relative to the other controlling movement of said links to position said platform in horizontal and vertical positions respectively, selectively controlled motor means connected to swing said links concurrently between relatively raised and lowered locations while maintaining said one pivot mounting stationary to hold said platform horizontal during such movement, an energy storage device connected between fixed points on each of said links, said points being closer to each other with said links in the lowered location than in the raised location thereof such that in movement of said links from the lowered to the raised location said fixed points separate and energy is stored in said device, and the location of said fixed points being such that the distance therebetween decreases during rotation of said one pivot mounting, said storage device acting to return energy stored therein during such rotation of said one pivot mounting to assist movement of said platform from a horizontal to a vertical position.

2. A tail gate and lift mechanism comprising a relatively flat platform, a pair of links pivotally connected at one end to said platform at vertically spaced positions, a bar link providing spaced apart pivot mountings for the other ends of said links, said bar link being rotatable about one of said pivot mountings controlling movement of said links to position said platform in horizontal and vertical positions respectively, selectively controlled motor means connected to swing said links concurrently between relatively raised and lowered locations with said bar link maintained stationary to hold said platform horizontal during such movement, a coil spring connected between fixed points on each of said links, said points being closer to each other with said links in the lowered location than in the raised location thereof such that in movement of said links from the lowered to the raised location said fixed points separate and energy is stored in said spring, and the location of said fixed points being such that the distance therebetween decreases during rotation of said bar link, said spring acting to return energy stored therein during rotation of said bar link to assist movement of said platform from a horizontal to a vertical position.

3. A tail gate and lift mechanism comprising a relatively flat platform, a pair of links pivotally connected at one end to said platform at vertically spaced positions, means providing spaced apart pivot mountings for the other ends of said links, one of said pivot mountings being rotatable relative to the other controlling movement of said links to position said platform in horizontal and vertical positions respectively, selectively controlled motor means connected to swing said links concurrently about their respective pivot mountings with said one pivot mounting maintained stationary to hold said platform horizontal during such movement, and a tension spring connected at opposite ends to fixed points on opposite ones of said links such that operation of said motor means to move said platform from a lowered to a raised location will cause said spring to be stretched and store energy therein, and rotation of said one pivot mounting moving said platform from a horizontal to a vertical position will decrease the distance between said fixed points and release energy stored in said spring to assist such rotation.

4. A combined lift mechanism and tail gate for trucks and the like, comprising a four bar parallel linkage system having pivotal joints between the ends of said bars, means providing a fixed pivotal mounting on one of said links about which the entire linkage system is rotatable, a platform including a substantially flat surface operable as a lift, means mounting said platform on the link in said system opposite from said one link such that the surface of said platform may be maintained essentially horizontal while providing for movement of the other two links in generally arcuate paths about their respective pivotal connections with said one link, power operated means connected to swing at least one of said other links about said one link between lowered and raised locations, said platform being movable together with said opposite link in said raised location to extend said platform surface in a generally vertical plane, and a spring extending between two fixed points on said other links spaced such that in said lowered location said spring is under essentially no tension and energy is stored in said spring by tensioning thereof due to parting movement of said fixed points during swinging movement of said linkage to said raised location, said fixed points being movable toward each other during pivoting movement of said platform from horizontal to vertical in said raised location with the energy stored in said spring being returned to the linkage in assistance of such pivoted movement of said platform.

5. A combined lift mechanism and tail gate for trucks and the like, comprising a four bar parallel linkage system having pivotal joints between the ends of said bars, means providing a fixed pivotal mounting on one of said links about which the entire linkage system is rotatable, stop means cooperating with said one link to maintain it normally in a generally vertical position, a platform including a substantially flat surface operable as a lift and a tail gate, means mounting said platform on the link in said system opposite from said one link and generally at right angles thereto such that the surface of said platform is maintained essentially horizontal when said one link is engaged with said stop means while providing for movement of the other links in generally arcuate paths about their respective pivotal connections with said one link, power operated means connected to swing said other links about said one link between lowered and raised locations, said platform being movable together with said opposite link in said raised location to extend said platform surface in a generally vertical plane with resultant swinging movement of said one link away from said stop means, and a spring extending between two fixed points on said other links so arranged that in said lowered location said spring is under slight tension and energy is stored in said spring due to separation of said fixed points during swinging movement of said linkage to said raised location, said fixed points being movable toward each other during pivoting movement of said platform from horizontal to vertical in said raised location with the energy stored in said spring being returned to the linkage in assistance of such pivotal movement of said platform.

References Cited in the file of this patent

UNITED STATES PATENTS

| | | |
|---|---|---|
| 2,696,923 | Messick | Dec. 14, 1954 |
| 2,719,637 | Wood | Oct. 4, 1955 |
| 2,725,152 | Gwinn | Nov. 29, 1955 |
| 2,850,187 | Roberts | Sept. 2, 1958 |